US007529385B2

(12) United States Patent
Lawandy et al.

(10) Patent No.: US 7,529,385 B2
(45) Date of Patent: May 5, 2009

(54) MARKING ARTICLES USING A COVERT DIGITALLY WATERMARKED IMAGE

(75) Inventors: Nabil M. Lawandy, North Kingstown, RI (US); Jeffrey L. Conroy, Rumford, RI (US); Andrei Smuk, Providence, RI (US)

(73) Assignee: Spectra Systems Corporation, Providence, RI (US)

( * ) Notice: Subject to any disclaimer, the term of this patent is extended or adjusted under 35 U.S.C. 154(b) by 0 days.

(21) Appl. No.: 11/708,984

(22) Filed: Feb. 21, 2007

(65) Prior Publication Data

US 2007/0145735 A1   Jun. 28, 2007

(51) Int. Cl.
*H04K 1/00*   (2006.01)
(52) U.S. Cl. ...................................... 382/100; 430/336
(58) Field of Classification Search ................. 382/100, 382/232; 358/3.28; 713/176; 250/271; 235/468, 235/491; 430/4, 139, 332, 336; 427/457, 427/487, 508, 510, 511, 157, 160
See application file for complete search history.

(56) References Cited

U.S. PATENT DOCUMENTS

| | | | |
|---|---|---|---|
| 3,513,320 A | 5/1970 | Weldon | 250/219 |
| 3,802,101 A | 4/1974 | Scantlin | 40/2.2 |
| 4,219,599 A | 8/1980 | Idelson et al. | 428/195 |
| 4,343,885 A | 8/1982 | Reardon, Jr. | 430/177 |
| 4,451,521 A | 5/1984 | Kaule et al. | 428/199 |
| 4,504,084 A | 3/1985 | Jauch | 283/94 |
| 4,538,059 A | 8/1985 | Rudland | 235/468 |
| 4,552,830 A | 11/1985 | Reardon, Jr. | 430/281 |
| 4,582,346 A | 4/1986 | Caprio et al. | 283/94 |
| 4,678,898 A | 7/1987 | Rudland | 235/468 |
| 4,736,425 A | 4/1988 | Jalon | 380/59 |
| 4,889,367 A | 12/1989 | Miller | 283/86 |
| 5,028,792 A | 7/1991 | Mullis | 250/474.1 |
| 5,160,171 A | 11/1992 | Gregory et al. | 283/91 |
| 5,171,040 A | 12/1992 | Orndorff | 283/93 |
| 5,297,815 A | 3/1994 | Anderson et al. | 283/93 |
| 5,369,273 A * | 11/1994 | Fisun et al. | 250/271 |
| 5,401,960 A * | 3/1995 | Fisun et al. | 250/271 |
| 5,436,115 A | 7/1995 | Mullis | 430/338 |
| 5,510,163 A | 4/1996 | Sullivan et al. | 428/64.1 |
| 5,522,921 A | 6/1996 | Custer | 106/21 R |
| 5,525,798 A | 6/1996 | Berson et al. | 250/271 |
| 5,549,953 A | 8/1996 | Li | 428/64.1 |
| 5,605,738 A | 2/1997 | McGinness et al. | 428/195 |
| 5,608,718 A | 3/1997 | Schiewe | 369/275.4 |
| 5,867,586 A | 2/1999 | Liang | 382/112 |
| 6,013,601 A | 1/2000 | Gundjian | 503/201 |
| 6,037,984 A | 3/2000 | Isnardi et al. | 348/403 |
| 6,119,943 A | 9/2000 | Christy | 235/468 |
| 6,120,902 A | 9/2000 | Van Havenbergh et al. | 428/423.1 |
| 6,138,913 A | 10/2000 | Cyr et al. | 235/468 |
| 6,140,267 A | 10/2000 | Gundjian | 503/201 |
| 6,203,069 B1 | 3/2001 | Outwater et al. | 283/88 |
| 6,219,329 B1 | 4/2001 | Tanaka et al. | 369/275.1 |
| 6,241,289 B1 | 6/2001 | Külper et al. | 283/86 |
| 6,243,480 B1 | 6/2001 | Zhao et al. | 382/100 |
| 6,269,169 B1 | 7/2001 | Funk et al. | 382/100 |
| 6,315,239 B1 | 11/2001 | Voigt | 244/3.22 |
| 6,315,329 B1 | 11/2001 | Greene | 283/67 |
| 6,343,138 B1 | 1/2002 | Rhoads | 382/100 |
| 6,354,501 B1 | 3/2002 | Outwater et al. | 235/462.01 |
| 6,359,985 B1 | 3/2002 | Koch et al. | 380/54 |
| 6,373,965 B1 | 4/2002 | Liang | 382/112 |
| 6,442,276 B1 | 8/2002 | Doljack | 380/51 |
| 6,458,294 B2 | 10/2002 | Oshima et al. | 252/301.36 |
| 6,754,377 B2 | 6/2004 | Rhoads | 382/135 |
| 2004/0041030 A1 | 3/2004 | Nimura et al. | 235/468 |

FOREIGN PATENT DOCUMENTS

| | | |
|---|---|---|
| GB | 2 300 596 A | 11/1996 |
| GB | 2 346 110 A | 8/2000 |
| WO | WO 98/40223 A1 | 9/1998 |
| WO | WO 01/41056 A1 | 6/2001 |
| WO | WO 01/67375 A1 | 9/2001 |

OTHER PUBLICATIONS

"UVT-UV Curing Systems-Why UV?; Quality; Economy" www.UVT.com/trendstips_UV.html, p. 1-1, Apr. 25, 2002.
"Unique Technology-Production friendly", www.photosec.com/tech2.htm, p. 1-1, Apr. 25, 2002.
"Invisible Ink" www.techreview.com/articles/prototype40302.asp, pp. 1-3, Apr. 25, 2002.
"SK6400 Sony Technical Data Sheet Liquid Adhesive", Sony Chemicals Corporation, www.sonychemicals.com, pp. 1-2.
"About UV Curing Technology" Primarc UV Technology, www.primarcuv.com/primarcuv/aboutuv.hym, pp. 1-8, Apr. 25, 2002.
"Invisible Security" Beaver Liminescers U.V. Energized Light-Emitting Organic Compounds, www.liminescers.com/apps_1_.html, pp. 1-2, Apr. 25, 2002.
He Tian et al., "Positive and Negative Fluorescent Imaging Induced by Naphtalimide Polymers", J.Mater Chem., 2002, 12, 1262-1267.

* cited by examiner

*Primary Examiner*—Andrew W Johns
(74) *Attorney, Agent, or Firm*—K&L Gates LLP

(57) ABSTRACT

A marking system that includes forming at least one marking in or on an article, wherein the image formed is not visible to the unaided human observer, and further contains at least one digital watermark. The digitally watermarked image comprises emissive and photoabsorptive portions. The digitally watermarked image is applied using a substance reactive to a predetermined excitation source, and exposure to ultraviolet light. Other traditional techniques, such as printing with fluorescent inks may be used in combination. The digitally watermarked image is subsequently observable upon exposure to the predetermined excitation source. The digitally watermarked image may be observed and decoded by appropriately configured detection systems, wherein the information obtained may be used for purposes including, but not limited to, authentication and security of the article or information contained within the article.

9 Claims, 8 Drawing Sheets

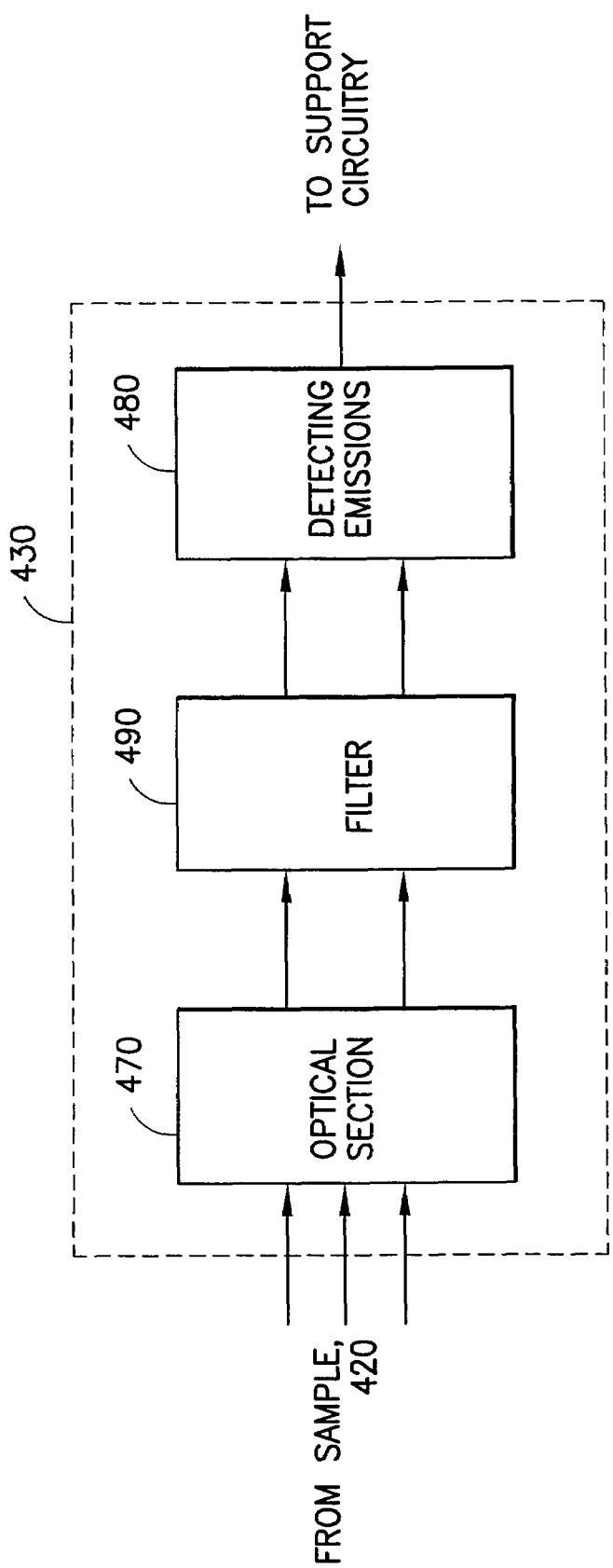

MARKING ARTICLES USING A COVERT DIGITALLY WATERMARKED IMAGE

CROSS REFERENCE TO RELATED APPLICATIONS

This application claims priority under 35 U.S.C. § 120 to U.S. patent application Ser. No. 10/165,104, scheduled to issue as U.S. Pat. No. 7,184,569, on Feb. 27, 2007, which claims priority under 35 U.S.C. § 119(e) to U.S. Provisional Patent Application Ser. No. 60/296,308, filed Jun. 6, 2001; U.S. Provisional Patent Application Ser. No. 60/310,914, filed Aug. 8, 2001; U.S. Provisional Patent Application Ser. No. 60/311,160, filed Aug. 9, 2001.

FIELD OF THE INVENTION

This invention relates to a method and apparatus for marking and authenticating articles, such as documents, currency, credit cards, passports, product labeling and packaging and other types of objects.

BACKGROUND OF THE INVENTION

Valuable items such as negotiable instruments, art work, etc., are susceptible to theft and counterfeiting. With respect to documents in particular, the advancement of color copier technology has made it fairly easy to create a color copy of any document, including currency, using commonly available equipment.

One security device for verifying an article's authenticity is a digital watermark. Digital watermarks or similar signatures typically use semantic information associated with the protected article, such as alphanumeric characters, physical features, etc. or other related information such as ownership information. These watermarks or signatures are typically kept with or incorporated into, the item to be protected. For example, a watermark may be printed within the substrate of a negotiable instrument including information regarding the value and the originator of the instrument. As another example, digital watermarking techniques may be used for both still and video images.

Various digital watermarking techniques are known for both still and video images. For example, reference may be had to U.S. Pat. No. 6,343,138 B1, entitled "Security Documents with Hidden Digital Data", issued Jan. 29, 2002. This patent discloses embedding a visible digital watermark into a video signal or a still image. Another example of use of digital watermarks with documents is disclosed in U.S. Pat. No. 6,243,480 B1, entitled "Digital authentication of analog documents," issued Jun. 5, 2001.

There are many techniques that are used to embed additional information in a digital image. One example is disclosed in U.S. Pat. No. 6,359,985, entitled a "Procedure for marking binary coded data sets," issued Mar. 19, 2002.

One technique involves separately coding an image and a watermark image on an article using a pseudo random number generator and a discrete cosine transform (DCT) to term coded blocks, one of the image to be watermarked and the other of the watermark itself. The DCT coefficients representing the coded watermark block and the coded image block are then added together to form a combined block to digitally watermark the image. For example, as disclosed in U.S. Pat. No. 6,037,984, entitled a "Method and Apparatus for Encoding a Watermark into a Digital Image or Image Sequence," issued Mar. 14, 2000, an image or sequence of images is watermarked using a conventional DCT unit and quantizer by generating an array of quantized DCT coefficients and watermarking the array by selecting certain DCT coefficients and replacing them with zero values. In the aforementioned patent, the array is further processed by a watermark inserter that replaces the zero valued coefficients with predefined watermark coefficients, and the coefficients form a watermarked array of DCT coefficients that constitutes a watermarked image.

Other common and known techniques for providing authentication of articles is through the use of invisible markings. One method is by printing in inks that are clear under normal illumination but emit visible fluorescent wavelengths upon ultraviolet (UV) excitation. One common technique is to use invisible ink to print security marks or information.

For documents with visible markings, it is very easy to copy or scan a document into a PC using scanning and printing technologies. In some instances, there is no way to tell if a reproduction is an original document. Even if the original document is coded with a visible code, once scanned, the code could be reproduced on the counterfeit document.

By using an invisible code or message on the document, for example "Original document—Do not copy", a scanner using visible light would not see the invisible ink. Another security feature of invisible codes recognizes that it may be difficult to reproduce the invisible ink for printing illegitmate copies. Typically, the formulation of such ink is difficult to duplicate.

Another patent, U.S. Pat. No. 6,269,169 B1, "Secure Document Reader And Method Therefor," issued Jul. 31, 2001, discloses an apparatus and a method for reading documents.

Additional approaches to providing authentication use fluorescent markings and more sophisticated printing methods, such as printing with visible graphics. Of interest to the teaching of this invention is U.S. Pat. No. 6,373,965, "Apparatus And Methods For Authentication Using Partially Fluorescent Graphic Images And OCR Characters", issued Apr. 16, 2002 discloses a system combining a source of ultraviolet light with apparatus for capturing and recognizing either graphic images or characters, or both. In this patent either a visible sub-image, or a fluorescent sub-image, or a combination image, may further contain steganographic (digital watermark) information that is encoded and inserted using conventional techniques. The digital watermark information may be similarly encoded and inserted into visible and/or fluorescent sub-portions and or recombined OCR characters.

Techniques for hiding information in an invisible fashion also include the use of various frequency bands in document security design. These optical techniques exploit the limitations of digital copiers and scanners by use of fine line printing patterns that use screen angle modulation of lines (SAM) and micro screen angle modulation techniques. For example, a protected document that includes background printed background matter and line pattern printed warning indicia is disclosed in U.S. Pat. No. 4,582,346, entitled "Document Security System," issued on Apr. 15, 1986. U.S. Pat. No. 5,171,040, entitled "Copy-Invalidating Document" issued on Dec. 15, 1992 discloses printing a pattern of warning indicia that is merged by human sensory perception with its background, but is distinguished and reproduced by xerographic copying as a result of the employment of two different screen values for the indicia and the background within and beyond the reproductive capability of the copier machine. U.S. Pat. No. 5,297,815, entitled "Security Printed Documents" issued Mar. 29, 1994, discloses a security document that provides an indication of when copied by a photocopy machine through the use of a background pattern and warning matter interspersed with blank areas of a substrate to provide a distinct intermeshed pattern so the warning printed is indistinguishable by the human eye. As methods of detecting and defeating security devices, such as digital watermarks, have become more sophisticated, there is a growing need for advancements in markings that provide additional security.

SUMMARY OF THE INVENTION

Disclosed herein are methods and apparatus for covertly marking an article with a digitally watermarked image that is not visible to the unaided observer. Also disclosed is an object that carries a normally invisible digitally watermarked image.

An aspect of this invention involves the discreet incorporation of security information into the appearance of an object.

Another aspect of this invention is the use of substances reactive to a predetermined excitation source as a coating over an article. The coating is optically variable, that is, an image formed in or with the coating appears at wavelengths outside of the visible region, and is not visible to the unaided observer.

An image that contains a digital watermark is provided on the surface of an object. The image contains a digital watermark that appears at wavelengths that are outside of the visible region of the electromagnetic spectrum. A variety of embodiments of images and digital watermarks are disclosed. Multiple watermarked images may be used for a single article, where the actual scheme selected is dependent upon, among other things, the needs of the user. The ability of an image to carry information in the form of a digital watermark provides for the discreet incorporation of information and application of security techniques. The digital watermark may carry a variety of information, including information useful for as examples, the authentication of the article, and/or decryption of information related to or contained within the article.

The image and watermark may be incorporated through techniques that include printing with UV light. Combinations of coating materials and exposure techniques may be used to control the appearance of the image and the digital watermark. Other methods for incorporating an image and digital watermark include traditional techniques, such as printing. Portions of the coating may be photoabsorptive. For example, portions of the coating may absorb ultraviolet light. Thus, the digital watermark may be characterized by regions that are emissive, and other regions that are photoabsorptive.

A coating material may be used in some embodiments that is responsive to any one of a number of predetermined excitation sources, or stimuli. Possible stimuli include, but are not limited to, wavelengths of light, thermal energy, humidity, pressure, and chemical sources.

The image may be observed by various techniques, such as the introduction of a fluorescent background with proper illumination, or through more sophisticated means. More sophisticated means for imaging include, for example, a charge coupled device (CCD) with proper sources of illumination. The imaging device may be connected with a processor to decipher watermark information.

DESCRIPTION OF THE FIGURES

For the present invention to be understood clearly and readily practiced, the present invention will be described in conjunction with the following figures, wherein:

FIG. 6 shows a block diagram of a detector array according to an embodiment of the present invention.

FIG. 7A depicts an image printed with a reactive substance. FIG. 7B depicts an image printed with a reactive substance, with an overlay coating.

DETAILED DESCRIPTION OF THE INVENTION

Figure 1:
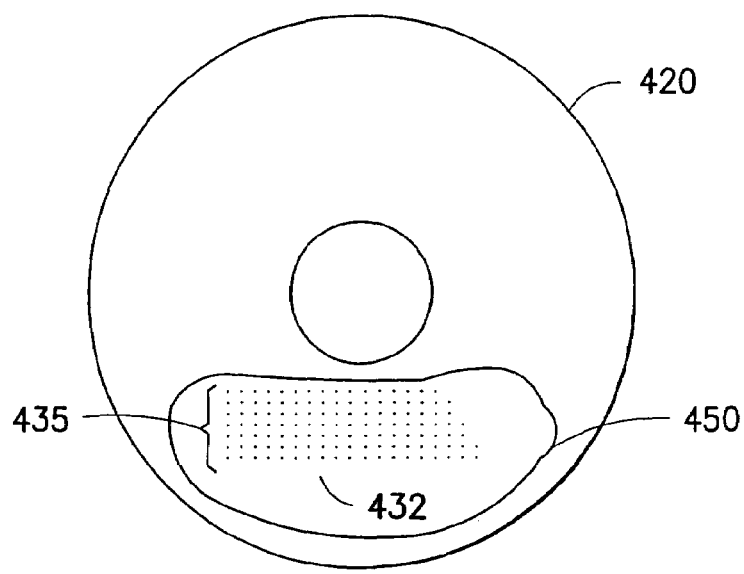
FIG. 1 depicts a digital watermark incorporated in a coating on an optical information medium according to an embodiment of the present invention.

It is to be understood that the figures and descriptions of the present invention have been simplified to illustrate elements that are relevant for a clear understanding of the present invention while eliminating, for purposes of clarity, other elements. For example, certain details relating to technologies for creating and embedding digital watermarks, such as automated or manual techniques, are not described herein. Those of ordinary skill in the art will recognize, however, that these and other elements may be desirable in a typical digital watermarking algorithm. A discussion of such elements is not provided because such elements are well known in the art and because they do not facilitate a better understanding of the present invention.

Disclosed herein are methods and apparatus for incorporating an image (also referred to herein as a "marking" or as a "mark") containing a digital watermark (also referred to herein as a "watermark") into or onto an article, where the marking and the watermark are only partially visible to an unaided observer, or they are invisible to the unaided observer. As referred to herein, it is generally considered that "visible" images and marks appear at wavelengths between about 400 nm to about 700 nm. "Invisible" images and marks may appear at wavelengths above the visible spectrum (above about 700 nm), which is herein referred to for purposes herein the infrared region, or IR; or, invisible images and marks may appear at wavelengths below the visible spectrum (downward from about 400 nm), in what is referred to herein the ultraviolet region, or UV. "Normally invisible," as used herein, refers to the visibility of a marking without the introduction of an external stimulus. Thus, it can be appreciated that an invisible image that becomes visible only upon exposure to a stimulus, for example, UV light, is "normally invisible." Additionally, invisible markings may appear at various wavelengths simultaneously.

The "unaided observer" may be a human and/or a detection system. A degree of authentication may occur by the human observer, where the human observer is possessed by the ability to verify the presence of an image, and may be able to verify certain characteristics related to the image. Detection systems have improved capabilities over a human observer, and may detect additional features of a mark, such as the presence and content of a digital watermark. Typically, a human observer is not able to detect a digital watermark, and additionally, the human observer will not be able to decipher a digital watermark without the aid of a detection system. However, the covert nature of the markings disclosed herein require that a detection system be "appropriately configured" in order to detect and decipher the marking. For example, characteristics of an "appropriately configured" detection system include, but are not limited to, illumination at proper wavelengths, and possession of digital watermarking algorithm information in order to decipher a digital watermark.

Invisible images may be observed through use of various intermediate mechanisms. For example, UV absorptive markings may be observed through the introduction of fluorescent materials that are emissive in the visible region. As an alternate example, an image may be observed in the IR region through use of equipment, such as a charge coupled device, appropriately configured to detect IR wavelengths. One skilled in the art will realize that many embodiments are possible, where images that are not visible to the unaided observer may viewed in the visible region, or through use of appropriately configured detection equipment presenting a visible portrayal of the image.

The image may include various conventions for presentation of data, including, but not limited to, data code symbologies, such as a bar code, graphics, text, alphanumeric, and digital watermarks.

The present invention relates to a method for processing an article to embed auxiliary data and the subsequent extraction and use of such data. In accordance with embodiments described herein, an image containing a multi-bit marking may be embedded directly or printed on the article, such as a security document, an optical storage media, or other article. Hardware or software systems can then read the marking, for example, to identify and authenticate the subject article.

The watermark is encoded within the image, and becomes part of the image. The watermark preferably cannot be detected or removed without prior knowledge of the specifics of the watermark. While the changes manifested by the incorporation of the watermark are generally too slight to be visible to the human eye, when a marked image appears, they are easily and consistently recognizable by, for example, a digital image scanner or a charge-coupled device where after recognition and imaging the marking is extracted interpreted and verified by, for example, a software algorithm.

The Marking

One non-limiting embodiment of the teachings herein describe use of a coating for application to an article, for example, an optical information medium such as a CD-ROM (compact disc, read-only-memory) or DVD (digital versatile disc). FIG. 1 shows an exemplary article 420, such as an optical information media, that includes a coating 450 that is supportive of an image 432, also referred to herein as a "marking." The marking 432 contains a digital watermark 435.

In accordance with the invention, the marking 432 is invisible, or substantially invisible, to the unaided observer. The coating 450 may have absorption properties such that it does not absorb a "readout" wavelength or wavelengths, such as those wavelengths used to read a CD-ROM or a DVD. The coating is applied in a manner that is consistent with the teachings herein, and the image and mark are likewise subsequently applied to the coating in a manner consistent with the teachings herein.

While the teachings herein are frequently described in the context of an optical information medium such as a CD-ROM or a DVD, the use of these articles is considered to be illustrative and is not limiting of the invention. It should be understood that the invention includes any article suitable for receiving a coating in accordance with these teachings. For example, the invention may be used to provide for marking of securities, product packages, labels, notes of currency, identification, credit cards, diplomas, passports, licenses, windshields, documents, and other items.

In another embodiment, a marking 432 and a digital watermark 435 are formed through deposition of a coating 450. In this embodiment, the coating 450 may be formed of, for example, a fluorescent ink.

Marking 432 may include, e.g., text information, such as a word or words, graphic information, such as a logo or barcode, or any other suitable information. According to a preferred embodiment, marking 432 includes embedded information (also called "coding information") and/or authentication signatures included in the digital watermark 435. For example, a digital watermark 435 may contain distribution chain or manufacturer specific information, the date of manufacture, the country of origin, the authorized distribution channel, or any other information that may be informative or useful about the article. It also might contain a hash value of the semantic information printed on the article for use in comparison for forgery detection. Thus, the article 420 may also carry additional information in a digital watermark 435 that may not be discernable without knowledge of digital watermark 435 and the ability to read the information included therein. Such indiscernible information may be useful for various applications, for instance with respect to the anti-diversion of branded products.

According to another embodiment, coding information for a digital watermark 435 may be generated from one or more physical characteristics or attributes of article 420. The coding information may be used as an input to the digital watermark 435. For example, the coding information may include attributes of the information recorded on article 420 such as the number of recorded titles, the author, the playtime of the CD or DVD, copyright dates, a serial number, an indication of the content owner, etc. Such physical characteristics may be directly or indirectly observable. For example, the characteristics included in the digital watermark 435 preferably require processing by a suitably programmed digital data processor with appropriate sensors, detectors, illumination sources, etc. in order to be detected and decoded.

The digital watermark 435 may be created using any of a number of methods. One example of a method for creating digital watermark 435 may include using the coding information as a seed or a pseudo-random number generator where the random number is used as a hash or some other one-way function for generating digital watermark 435. Another technique may include using the coding information, the output of a pseudo-random number generator, and any other appropriate information as distinct inputs to an algorithm including a discrete cosine transform to form a digitally watermarked image. In another embodiment, one or more of the various inputs to the digital watermarking algorithm may be used as a key to "unlock" or otherwise obtain information included in digital watermark 435, or other information, such as information within the article 420.

By whatever means created, and as was noted above, the digitally watermarked image or marking 432 is invisible or substantially invisible to the unaided observer.

The Coating

The coating 450 is formed of a substance that is reactive to a predetermined excitation source. A variety of materials may be used; the actual material selected depends upon, among other things, the needs of the user regarding a particular application. Examples of excitation sources, include, but are not limited to, illumination with electromagnetic radiation, including certain wavelengths of light; chemical; thermal; pressure; and, humidity. Once applied, the coating 450 does not significantly interfere with the use or functionality of the article 420. For example, in the case of optical media 420, the coating 450 does not interfere with the readout laser mechanism, and the recovery of data from the optical media 420.

Techniques for applying coating 450 may include, but are not limited to, printing, spraying, rolling, silk-screening, painting, or any other technique suitable for applying the coating 450 as described herein. Coating 450 may be processed or applied in a manner to exhibit the marking 432 and the digital watermark 435. According to an embodiment, the coating 450 can be printed, photo-bleached with a mask, engraved and/or ablated to exhibit the marking 432. According to another embodiment, the coating 450 may be processed to exhibit the marking 432 by directly writing with a laser or any other suitable laser writing technique.

Coating 450 may be colored or colorless to the eye, and may be fluorescent under certain electromagnetic radiation. According to an embodiment, coating 450 includes compounds such as metal chelates, fluorescent dyes or laser dyes. According to other embodiments, coating 450 includes organic phosphors or inorganic phosphors. For example, coating 450 may include an inorganic phosphor such as silver doped zinc sulfide (Ag:ZnS). According to another embodiment in which coating 450 is fluorescent, coating 450 may include a thermoplastic resin and an insoluble fluorescent pigment in a suitable carrier. According to a further embodiment, the pigment may include a dye dissolved in a plastic material.

According to an embodiment, the coating 450 may be applied to an optical information medium 420 (for example, the play side). In this embodiment, readout light wavelengths for the optical information medium 420 may include wavelengths of about 400 nm, about 440 nm, about 630 nm, about 650 nm, about 780 nm, or any other readout wavelength, or combination of wavelengths, that may be employed to read information from optical information medium 420. Those of ordinary skill in the art will appreciate that coating 450 may be applied to either the "play" or "non-play" side of optical information medium 420. In this embodiment, the coating 450 may have any desired thickness, provided the thickness does not interfere with the readout of optical information medium 420 when applied to the readout side of medium 420. The coating 450 may be observable at any wavelength, other than wavelengths that would be substantially interfering with the readout mechanism of the optical information medium 420.

According to embodiments where the coating 450 is fluorescent, the coating 450 may absorb electromagnetic radiation either at ultraviolet (UV), visible, near infrared (IR), or longer wavelengths. The fluorescent coating 450 may emit wavelengths in any one of UV, near UV, near IR or IR regions. According to another embodiment, where the coating 450 is a colorless fluorescent coating 450, the marking 432 may only appear under illumination with a predetermined source, such as a UV light source.

Printing with UV Light

Figure 2:
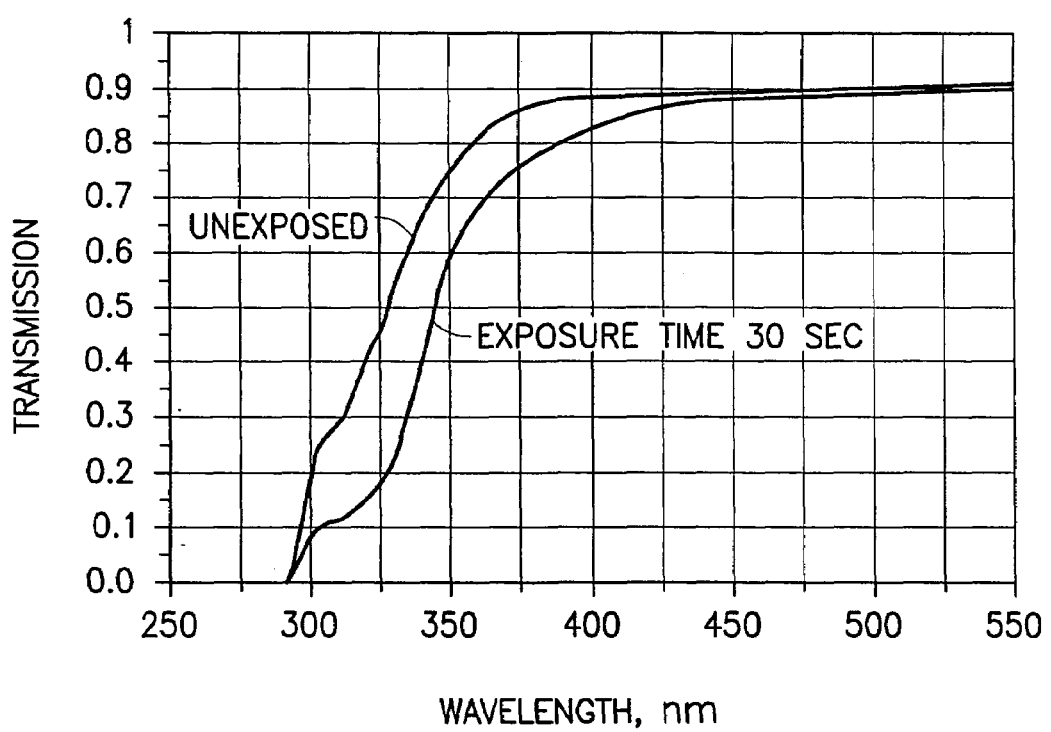
FIG. 2 illustrates transmission spectra of one particular lacquer at different curing times.

The disclosed technique of invisible, or substantially invisible, printing by UV light is based on several mechanisms. One mechanism recognizes the property of some materials to become more absorbing of UV light due to progressive exposure of the material to UV light. This property is exhibited by a number of polymers and glasses, and is attributed to photogeneration of defects that contribute to the absorption in the UV region of the electromagnetic spectrum (called the "defect generation mechanism"). FIG. 2 illustrates the effect of this mechanism, showing the transmission spectra of a polycarbonate substrate before and after exposure to intense UV light produced by Xenon RC-747™ pulsed lamp.

Figure 3:
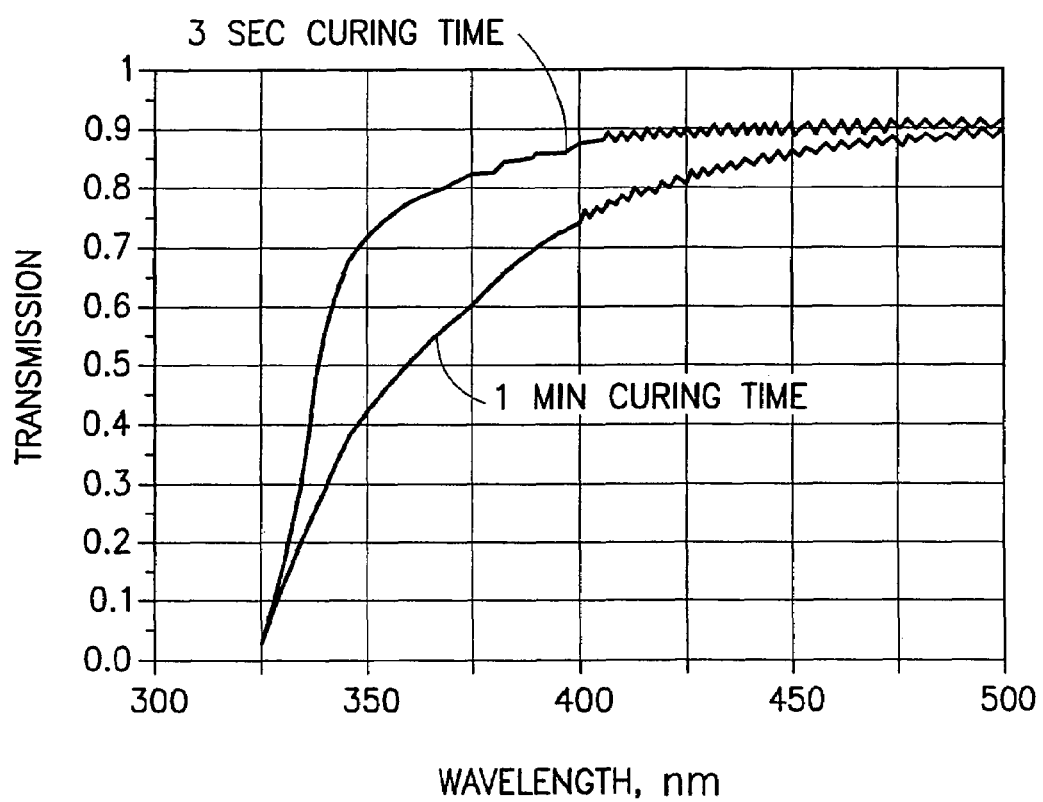
FIG. 3 illustrates a transmission spectra of polycarbonate substrate before and after UV exposure.

In addition to the defect generation mechanism, another mechanism is possible, such as in the case of photocurable polymers. As UV light leads to polymerization of a monomeric coating, the total UV exposure will determine the degree of polymerization of the material, and therefore, its optical properties including UV absorption in particular. Thus, exposure of a partially cured film to UV light results in higher degree of polymerization, which accounts for the difference in UV absorption compared to the original less-cured material (called the "curing time mechanism"). FIG. 3 illustrates the effect of this mechanism, showing the transmission spectra of a 19-μm-thick layer of Sony Chemicals lacquer SK6400 cured by UV light of a Xenon RC-747™ pulsed lamp with total exposure times of three seconds and one minute.

Due to either of the aforementioned mechanisms, selective UV exposure of some areas of certain substrates result in the formation of latent contrast between the exposed and virgin parts of the substrate. In one embodiment, this contrast becomes visible by placing a fluorescent layer under the substrate and illuminating a polymeric substrate with long-wave UV or "black" light. Higher absorption of the illumination by the previously exposed areas of the substrate results in lower excitation levels of the underlying fluorescent layer and, consequently, lower brightness of the fluorescence, thereby producing a visible contrast. The substrate is assumed to be at least partially transmissive to the UV excitation and fluorescent emission.

Latent contrast formation is also possible using a further mechanism, called photobleaching that induces modification of the optical properties of a target molecule by irradiation of the target with UV. This technique may be practiced in a host polymer, provided the host is supportive of irradiation with UV. In one embodiment, a UV sensitive fluorescent additive is used as a target molecule, where the additive is mixed into a UV transparent polymer. In this embodiment, irradiation of the substrate with UV provides for modification of the optical properties of the fluorescent additive.

Latent contrast may be achieved by using the three methods alone, or in combination. For example, fluorescent pigment may be intermixed with a coating 450 that carries the invisible print according to an embodiment of the present invention. This technique can be used for making invisible markings 432 on the read out surfaces of optical discs such as CDs and DVDs. A clear polymer impregnated with a fluorescent additive is applied to the read out surface of an optical disc 420 by spin-coating and, subsequently, is cured. According to such an embodiment, coating 450 is uniform and transparent in the visible and near-IR regions of the spectrum and, therefore, produces no interference with the read out laser beam. At this point in the manufacturing process, the coating 450 produces uniform fluorescence across the entire coated area. A desired marking 432 may be transferred onto the coating 450 by the above mechanisms of photoinduced UV absorption, and/or by photobleaching. The transfer may be achieved through UV irradiation using, for example, a photomask or by a direct laser writing process.

Any of the above-mentioned mechanisms may be used to fabricate an image 432 containing a watermark 435. For example, a gray-scale image 432 encoded with a watermark 435 is printed on a UV-transparent substrate, with gray-scale print providing spatially variable attenuation for the UV radiation in accordance with the desired watermarked image 432, thereby providing a photomask for subsequent transfer of the contrast onto a fluorescent polymeric substrate 420. Exposure of the fluorescent polymer to an intense UV-source through the prepared photomask results in transfer of the watermarked image 432 onto the fluorescent polymer as a latent contrast. This latent contrast can be visualized, for example, via fluorescence under low-intensity UV radiation or "black" light and the watermarked image 432 read out and decoded. Since digital watermarking supports inversion of contrast, either a positive or a negative photomask can be used, with the final fluorescent contrast being respectively negative or positive, while preserving the encoded watermark 435. An example of a system that is supportive of this technique is the SysCop™ system available from MediaSec Technologies of Providence, R.I.

Figure 7A:
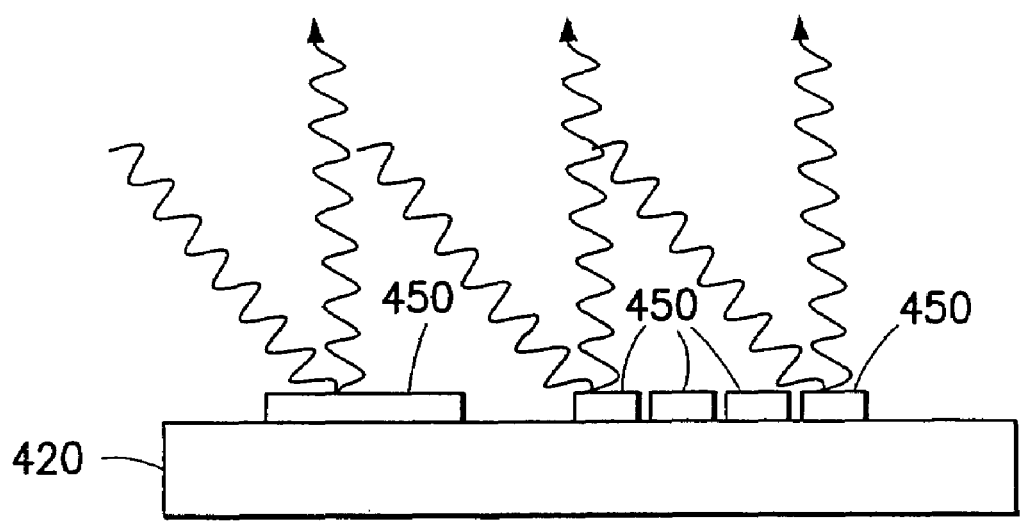
FIG. 7A-B, collectively referred to herein as FIG. 7, is a schematic illustration of application of coatings.
Figure 7B:
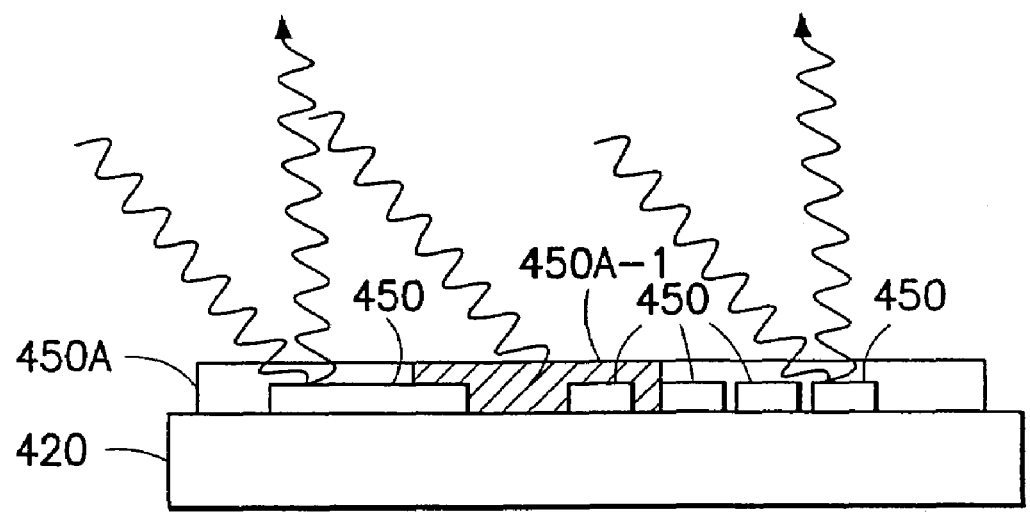

FIG. 7 depicts embodiments of markings 432 with digital watermarks 435. In FIG. 7A, a marking 432 with a digital watermark 435 is printed onto a substrate using a substance that is reactive to an excitation source. FIG. 7A depicts a marking 432 that is visible when illuminated with wavelengths of UV light. For convenience, the area of the marking over the article 420 is identified from the article 420 side of the marking 432. The coating 450 absorbs light in the UV region, thereby causing a fluorescent emission in the visible region. FIG. 7B depicts another embodiment, where the embodiment shown in FIG. 7A is further embellished with another coating 450A, where a portion 450A-1 of the coating 450A has been irradiated with UV light. In FIG. 7B, the portion of the second coating 450A-1 provides photoabsorption of wavelengths of UV light, thereby providing a perception of an image 432 that is modified from the image 432 that appears in FIG. 7A.

Figure 8:
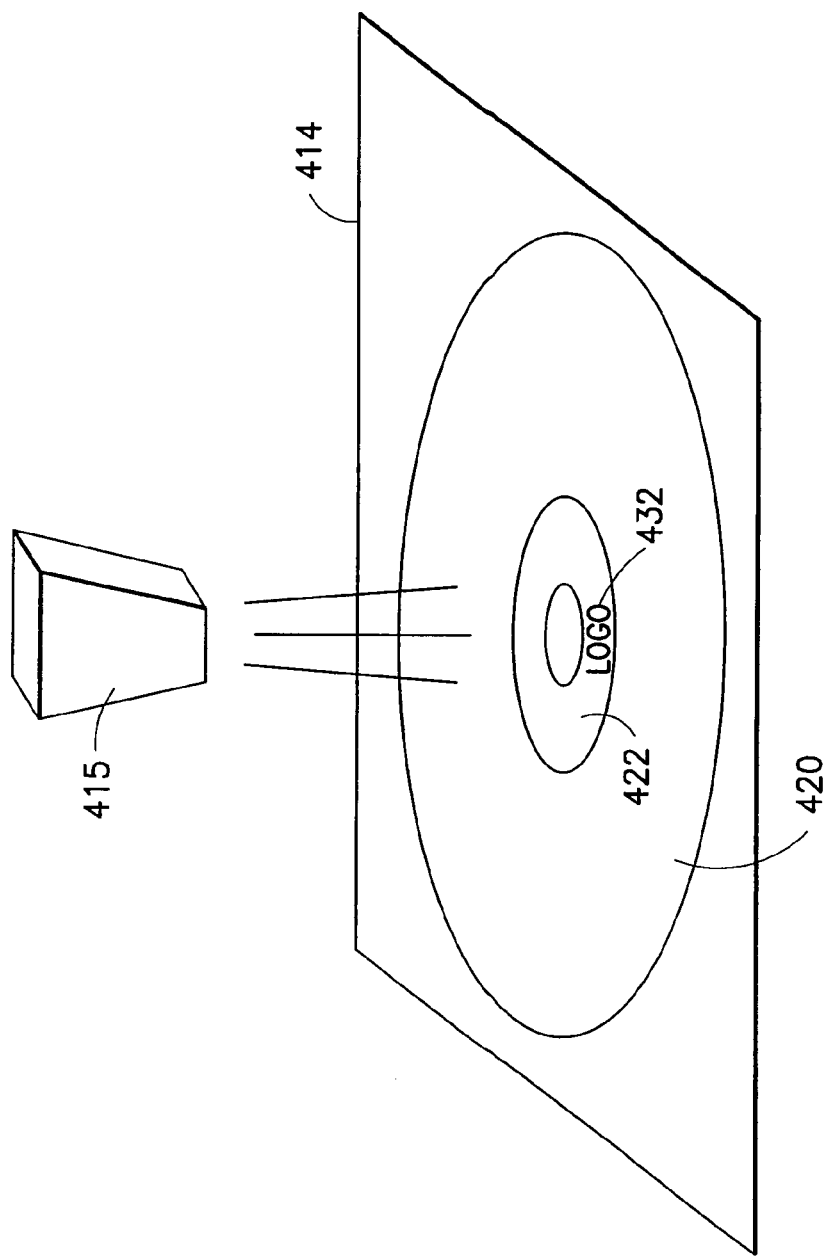
FIG. 8 is an illustration of an optical media with an information bearing marking inscribed in the clamping area.

FIG. 8 is an illustration of an embodiment where information has been transferred onto an optical media 420. In FIG. 8, the optical media 420 is a CD or DVD, which has a central clamping area 422 that is not used for the storage of data. The central clamping area 422 is substantially transparent. In this embodiment, an image 432 includes a watermark 435, which is formed in the clamping area 422 through use of a photomask, or any other suitable technique. The marking 432 was previously transferred in a predetermined pattern according to the needs of the user. In this embodiment, viewing of the image 432 and the mark 435 involves placing the optical media 420 over a fluorescent background 414. The fluorescent background 414 is independent of the optical media 420, and is supplied to provide contrast when exposed to UV light. UV light may be supplied by a low intensity UV light supply 415. Once the optical media 420 is placed over the fluorescent background 414 and exposed to UV light from the UV light supply 415, the latent contrast from the UV exposure becomes apparent and the information bearing marking 432 becomes visible.

According to another embodiment of the present invention, a fluorescent polymeric layer is applied between the halves of a DVD 420. The latent image 432 is produced on the read out side (also called the "label side") by selective exposure of the DVD 420 to intense UV light through a photomask or by direct writing with a UV laser. Subsequent "black" light illumination generates a visible contrast fluorescence pattern. In this embodiment, the fluorescent layer is attached to the substrate 420 that is carrying the invisible print.

Latent contrast may be used alone or in combination with other techniques to create or enhance a digital watermark 435. In the embodiments where latent contrast is included in the digital watermark 435, the digital watermark 435 is characterized by portions that are at least partially absorptive of UV. Examples include, but are not limited to, embodiments such as the embodiment depicted in FIG. 7B; and other embodiments where exposure to UV may be used to create shading and/or other effects. Further embodiments make use of photobleaching, where the fluorescent dye used in an invisible watermark is modified. In these embodiments, a UV laser may be used to enhance the marking, and provide for degrees of detail or control that may not be achievable through traditional techniques for application of fluorescent ink.

It may therefore be realized by one of ordinary skill in the art, that the cooperation of ultraviolet irradiation and other techniques can provide for a degree of refinement in invisible images not otherwise attainable.

Detection

A detector in combination with an excitation source may be used to read or display the coating 450. The detector-source combination may be, for example, a handheld reader with a self contained UV source, such as a xenon flash source. The reader may also include a CCD pixel array and a display. One suitable type of detector is known as VeriCam™, available from Spectra Systems of Providence, R.I. According to another embodiment, the reader may include a visible light scanner to convert the image to a digitized form.

Figure 4:
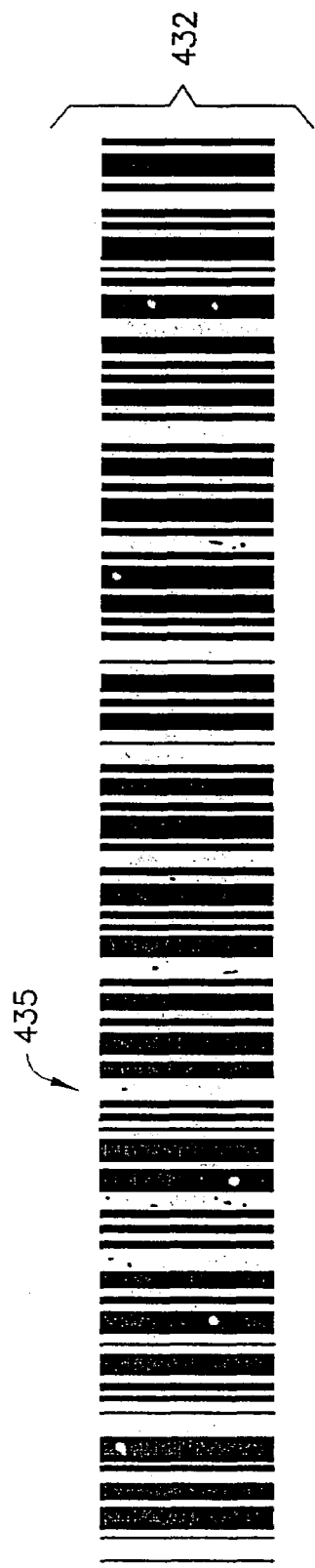
FIG. 4 shows an exemplary bar code having a digital watermark.

In another embodiment, a bar code symbology may be impregnated with a digital watermark 435. FIG. 4 shows an example of such a bar code 432. Barcode 432 may be implemented using any suitable symbology including, without limitation, 3 of 9, 12 of 5, Code 128, UPC, 2-D, and 3-D symbologies. In addition to being encrypted with digitally watermarked information, bar code 432 can be made to contain a pass key to allow reading of bar code 432 itself. If the digital watermark 435 is not read, a properly designed terminal will not read bar code 432. The watermark 435 may be incorporated, for example, as a digitally embedded imprint in the bit pattern or noise of a digital image of the bar code 432.

Software technologies may be used to embed the digital watermark 435 such that it is recoverable using software or other automated or manual techniques. The digital watermark 435 may also include additional information that may be decoded by using a key to "unlock" data, for example, data included in another digital watermark 435, or data within the article 420. The digital watermark 435, and the other information that may be embedded in the digital watermark 435, is robust to image deformations, rotations, copying, multiple renderings, conversions, and other manipulations.

With respect to FIG. 1, the decoding or identification of coating 450 may employ imaging of the coating 450 and/or the unique marking 432 as well as the detection of fluorescent emission or color if present. This can be achieved, for example, by using a microscope system coupled to a monolithic spectrometer.

Another embodiment may use a narrow band filtered detection system including CCD camera-based devices. Use of these, and other appropriately configured detection systems may provide for observation of markings 432 that are not otherwise visible to the unaided observer. Such systems may be used, among other things, to detect an image 432, and to present a copy of the image 432 to a user, wherein the copy is provided by a device presenting the image 432 in the visible region. For example, an image 432 that appears in the ultraviolet or the infrared region may be viewed using appropriate equipment that includes a detector configured to detect in the appropriate region, connected with image processing equipment and a display monitor, wherein the display monitor provides for viewing of the image 432 by the human observer. However, the slight variations in the image 432 that compose the digital watermark 435 may, or may not, become apparent. In this manner, as one example, images 432 that were otherwise undetectable to a human observer become observable.

Figure 5:
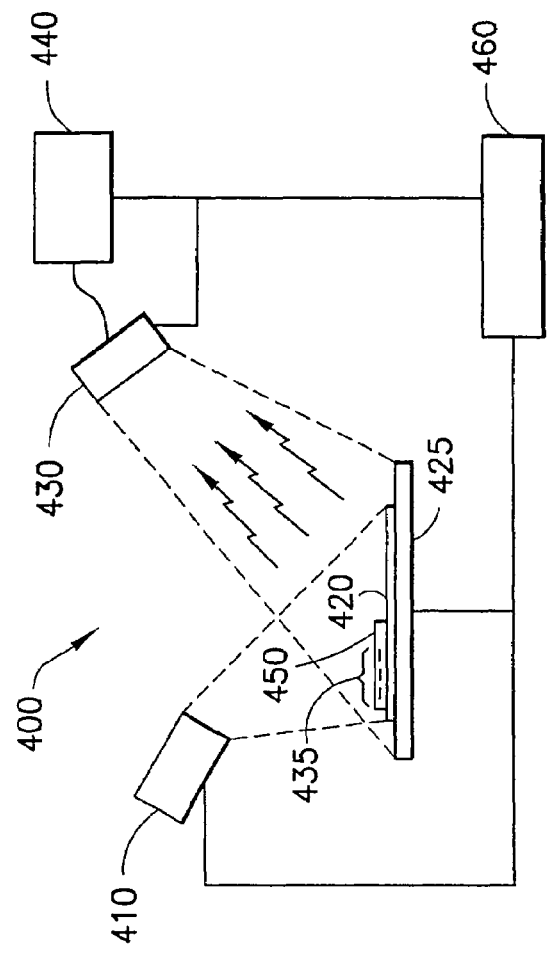
FIG. 5 shows a schematic diagram of a detection system to identify and authenticate items in accordance with an embodiment the present invention.

FIG. 5 shows an exemplary detection system 400 according to an embodiment of the present invention. A source of radiation 410 is directed on article 420 to be examined, such as a CD-ROM, DVD, or other suitable type of optically encoded medium. Source 410 may generate any type of radiation, such as UV radiation, that is suitable for detecting coating 450 included on article 420 and/or watermark 435 or any appropriate attributes of article 420. Article 420 may be mounted on a positioning device 425 to locate article 420 for irradiation. Positioning device 425 may include a conveyor or any other type of device suitable for transporting or locating the article 420 for irradiation. Detection system 400 may also include a detector array 430, such as a CCD camera or other suitable detection device with appropriate support circuitry 440 for detecting an image of article 420 and watermark 435. Detector array 430 may be fixed, moveable or handheld. Source 410 and detector array 430 may also comprise positioning devices (not shown) for locating these devices for optimum performance. Detector array 430 may be capable of detecting the spectral content of any emissions, in addition to any other physical characteristics of watermark 435 or article 420 for identification and authentication of article 420. Control circuitry 460 directs the activity of system 400, and in particular controls source 410, positioning device 425, detector array 436 and support circuitry 440. It is also within the scope or the invention to use a simple handheld reader, such as the one described above, as a detection system 400.

According to an embodiment shown in FIG. 6, a detector array 430 includes an optical section 470 for focusing received emissions within detector array 430, an array of sensors 480 for detecting the emissions, and a filter section 490 for allowing only the frequencies of interest to impinge on sensors 480. Optical section 470 may include a microscope system or any other system suitable for magnifying or otherwise focusing the image of article 420 and/or any emissions from item 420 within the detector array 430. The sensor array 480 may include any array of sensors suitable for detecting the emissions and/or physical characteristics of article 420 such as, for example, a diode array, a CCD array, etc. The sensor array 480 may be a one dimensional linear array that is scanned relative to the marking 432, or it may be a two dimensional area array that provides for "snap shot" imaging. Using this arrangement, the output of the detector array 430 is analyzed to detect the characteristics of and thereby interpret watermark 435 and/or coating 450 so as to identify and authenticate article 420, such as by obtaining plural bit data contained in the digital watermark 435.

Further Embodiments

A variety of embodiments of the invention disclosed herein is possible. One skilled in the art will recognize that the embodiments disclosed herein are illustrative of features of this invention, and are not limiting of the invention. One skilled in the art will also recognize that many variations of this invention are achievable without deviation from the spirit of this invention. Among other things, the needs of the user play a role in the determination of the actual scheme used. Examples of further embodiments are thus now provided.

Multiple images 432 containing watermarks 435 may be used to mark a single article 420. Images 432 may be disposed upon the article 420 with a distinct relationship to each other. For example, an image 432 could be overlapping, concentric, in registration with, or offset by some predetermined value from, another image 432. The positioning of images 432 relative to each other, or on an article 420, may be used to provide additional information to a user. In another example, a first image 432 and watermark 435 may be not be apparent at visible wavelengths, while a second image 432 and watermark 435 may appear at visible wavelengths.

Figure 11A:
FIG. 11A-C, collectively referred to as FIG. 11, is an illustration of a split image.
Figure 11B:
Figure 11C:

Images 432 may be used in cooperation with one another. For example, the first image 432, once detected may be used to locate the second image 432. FIGS. 11A-11C depict an example of a "split" image 432. FIG. 11A depicts one compliment 432L of the image 432, which may be referred to for convenience as a "left handed" portion. FIG. 11B depicts the right handed compliment 432R of the image 432. FIG. 11C depicts the image 432, after a processor has assembled the left and right images 432. A "split" image 432 may be used, which contains a portion of a total image 432 and/or watermark 435, where the complimentary portion is contained in a complimentary image 432, or multiples of images 432. The split image 432 may be reconstructed into a single image 432, among other means, by use of a processing system that is appropriately configured.

Figure 9:
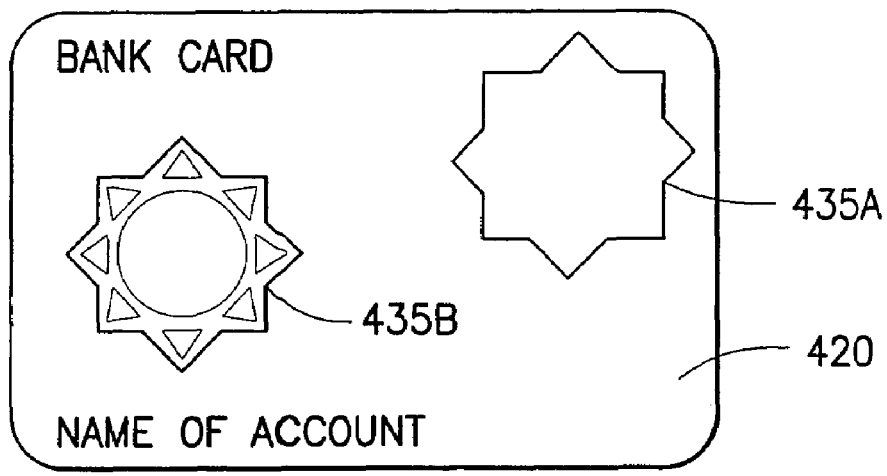
FIG. 9 is an illustration of the use of multiple digital watermarks in a credit card.

In other embodiments, the information contained in a digital watermark 435 is used in some relationship to other digital watermarks 435 incorporated with the article 420. For example, one digital watermark 435 may be used as a key to another digital watermark 435. FIG. 9. provides and example of this embodiment.

In the embodiment shown in FIG. 9, a first image 432 and digital watermark 435A is not visible to a human observer under normal illumination with visible wavelengths. Information contained in the watermark 435A may be used for an authentication of a bank card 420, where the presence of the watermark 435A, or information contained within the watermark 435A, is compared to corresponding features of an authentic version of the mark 435A. Once authenticated, the detection and authentication system that is used to detect the mark is directed to a second invisible image 432 and digital watermark 435B. In this embodiment, the second watermark 435B may carry additional information, such as a decryption key used to gain access to a bank card system. In another embodiment, a first digital watermark 435A may be observed by detection systems using visible light to excite the materials, which thereby causes the substrate materials to fluoresce in the IR region. In this embodiment, the second digital watermark 435B may be observed by detection systems using non-visible light, such as ultraviolet light.

In one variation of this embodiment, the second digital watermark 435B is formed of a material that may be imaged at a predetermined IR wavelength. A component of the detection system is configured to detect a narrow band of IR wavelengths containing the predetermined wavelength. In this example, the second watermark 435B may contain information needed by the user, such as, for example, encoded biometric data for verification of identity.

Figure 10:
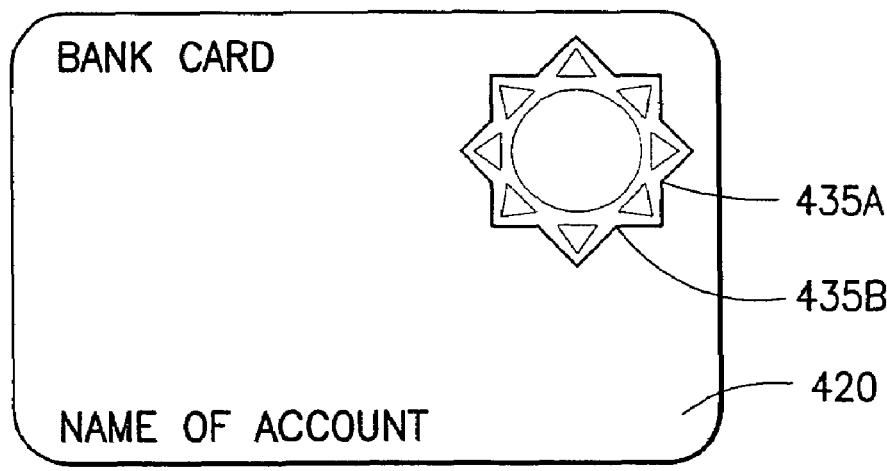
FIG. 10 is an illustration of multiple digital watermarks in registration with each other.

As shown in FIG. 10, another embodiment involves use of digital watermarks 435 in registration with each other. For example, a visible digital watermark 435A is applied to an article 420, with a second and invisible digital watermark 435B applied in registration with the first digital watermark 435A. As an alternate embodiment, the first digital watermark 435A and the second digital watermark 435B may be included in concentric images with varied appearance. In these embodiments, the first digital watermark 435A may appear when illuminated by a predetermined first band of wavelengths, for example in the UV region, and the second digital watermark 435B may appear when illuminated by a predetermined second band of wavelengths, for example in the IR region.

It is easily recognizable by one of ordinary skill in the art that many embodiments may be realized. For example, one may vary aspects such as, but not limited to, the wavelength at which a watermark 435 may appear, the number of watermarks 435 in use, placement of watermarks 435, the information contained in a watermark 435, and the use of watermarks 435 as sources of various information, such as keys for access to other information.

In some embodiments of these teachings other stimuli may be used to make a normally invisible marking 432 become visible, such as but not limited to, at least one of the application of heat, a change in humidity, a change in pressure, or the application of one or more chemical agents.

Preferably, after the stimulus is removed, the marking 432 one more becomes invisible, or substantially invisible, to the unaided observer, the observer being either a human or machine observer.

It can thus be appreciated that while the invention has been particularly shown and described with respect to preferred embodiments thereof, it will be understood by those skilled in the art that changes in form and details may be made therein without departing from the scope and spirit of the invention.

What is claimed is:

1. A method of forming a mark on an article, comprising:
   selecting a marking for said article;
   applying a coating to said article; and,
   exposing said article to ultraviolet light for applying at least one digitally watermarked image of said marking to said article, wherein said at least one digitally watermarked image is not substantially observable to the unaided observer, and said at least one digitally watermarked image being observable upon exposure to a predetermined excitation source.

2. A method as in claim 1, wherein said coating comprises at least one of a polymeric material, a monomeric material, a metal chelate, an organic phosphor, an inorganic phosphor, a fluorescent dye and a laser dye.

3. A method as in claim 1, wherein applying at least one digitally watermarked image of said marking comprises at least one of printing, spraying, rolling, silk screening and painting.

4. A method as in claim 1, wherein applying at least one digitally watermarked image of said marking comprises use of at least one of a positive photomask, a negative photomask, and a UV laser.

5. A method as in claim 1, wherein applying at least one digitally watermarked image of said marking comprises applying a portion of said mark in a first image, and at least one complimentary portion or said mark in at least one second image.

6. A method as in claim 1, further comprising printing the digital watermark onto a substrate using a substance that is photoreactive to the predetermined excitation source.

7. A method as in claim 1, further comprising applying a fluorescent polymeric layer between halves of the article before exposing the article to the ultraviolet light.

8. A method as in claim 1, further comprising applying a fluorescent dye into the article before exposing the article to ultraviolet light.

9. A method as in clam 8, further comprising photobleaching the fluorescent dye to modify the fluorescent dye.

* * * * *